United States Patent
Andrews et al.

(10) Patent No.: US 6,439,905 B2
(45) Date of Patent: *Aug. 27, 2002

(54) ELECTRICAL CONNECTOR WITH A LOOP AND HELICAL TURN

(75) Inventors: Trevor Andrews, Alton; Neil Charman, Sandhurst, both of (GB)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/321,130

(22) Filed: May 27, 1999

(30) Foreign Application Priority Data

May 29, 1998 (GB) .............................. 9811662
Feb. 25, 1999 (GB) .............................. 9904288

(51) Int. Cl.⁷ .................... H01R 3/00; H01R 39/00; H02H 5/04
(52) U.S. Cl. .................... 439/165; 439/15; 361/103; 361/104
(58) Field of Search .................... 439/165, 31, 15, 439/162, 164, 446, 534; 361/103, 104

(56) References Cited

U.S. PATENT DOCUMENTS

| | | | |
|---|---|---|---|
| 4,885,430 A | * 12/1989 | Kinser, Jr. et al. | 174/254 |
| 5,046,951 A | * 9/1991 | Suzuki | 439/15 |
| 5,141,446 A | 8/1992 | Ozouf et al. | |
| 5,278,725 A | 1/1994 | Konno et al. | |
| 5,606,730 A | 2/1997 | Rush et al. | |
| 5,681,176 A | 10/1997 | Ibaraki et al. | |

FOREIGN PATENT DOCUMENTS

| | | |
|---|---|---|
| EP | 0671788 | 9/1995 |
| EP | 0720399 | 7/1996 |
| GB | 2295850 | 6/1996 |
| GB | 2300670 | 11/1996 |
| GB | 2331188 | 5/1999 |
| GB | 2335089 | 8/1999 |
| WO | 901096 | 9/1990 |

* cited by examiner

*Primary Examiner*—Brian Sircus
*Assistant Examiner*—Chandrika Prasad
(74) *Attorney, Agent, or Firm*—Antonelli, Terry, Stout & Kraus, LLP

(57) ABSTRACT

An electronic device comprising at least a first part and a second part, the first part and second part being movable between a first closed position and a second open position. The device has a hinge for coupling together the first part and the second part, the hinge providing an axis of rotation and including a knuckle on the first part and a knuckle on the second part. An electrical connector is provided for connecting electronic components housed in the first part and the second part, said connector being routed via the hinge. The electrical connector comprises an elongate body having a helical turn along its length which helical turn extends from within the knuckle on the first part to within the knuckle on the second part.

11 Claims, 5 Drawing Sheets

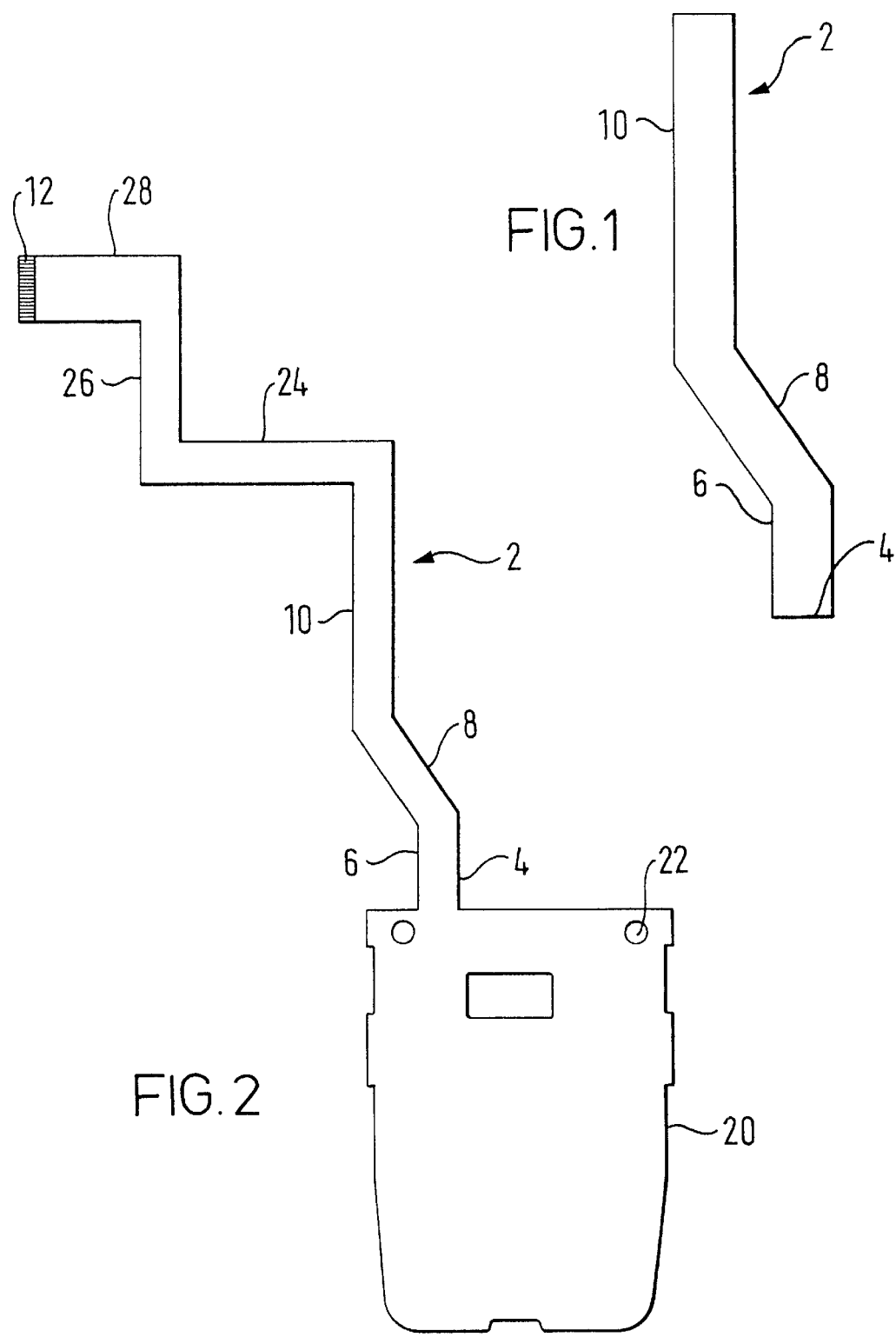

ELECTRICAL CONNECTOR WITH A LOOP AND HELICAL TURN

BACKGROUND OF THE INVENTION

This invention relates to an electrical connector and especially a flexible connector for coupling together two electronic components to allow a certain degree of freedom of movement.

Many portable devices, such as mobile telephones and personal organisers, include two parts which are hinged together, an electrical connector being provided to connect the electrical components in the two parts. This electrical connector is clearly exposed to wear owing to the frequent opening and closing of the device.

An example of a flexible connector for use with a hinged device is shown in UK Patent application no. 2300 670. This flexible connector has an elongate body which passes though a cylinder in the hinge. This cylinder is designed to enable the connector to be routed so that the hinge elements move without the conductor being damaged.

U.S. Pat. No. 5,606,730 describes a coupler which comprises a wire-like elongate body which undergoes a torsional twisting and untwisting as the device is opened and closed. Thus the wire coupler twists and flexes when the device is opened.

SUMMARY OF THE INVENTION

In accordance with the invention there is provided an electronic which includes at least a first part and a second part, the first part and second part being movable between a first closed position and a second open position; a hinge for coupling together the first part and the second part, the hinge providing an axis of rotation and including a knuckle on the first part and a knuckle on the second part; an electrical connector for connecting electronic components housed in the first part and the second part, said connector being routed via the hinge; wherein the electrical connector includes an elongate body having a helical turn along its length which helical turn extends from within the knuckle on the first part to within the knuckle on the second part.

Preferably the helical turn is a 360° turn and a 180° loop is provided adjacent to the helical turn.

In a second aspect of the invention, an electrical connector comprises an elongate body having a helical turn along its length.

In third aspect of the invention an electrical connector for connecting together at least two electronic components, comprises a first and a second end and a first section, one end of which is the first end connectable to a first component; a second section at an oblique angle to the first section for forming a helical turn in the connector; and a third section, parallel to the first, for connection to a second component.

Preferably the electrical connector further comprises: a fourth section connected to the third, at right-angles to the third; a fifth section at right-angles to the fourth section; a sixth section at right-angles to the fifth, the sixth section having an end connectable to a second component; the third, fourth, fifth and sixth sections being arranged in a step formation leading generally in the same direction as the second section.

In a further aspect of the invention a method of assembling an electronic device having at least two parts coupled together in a hinged manner, said method comprising: taking a connector according to the invention; connecting the first end of the connector to a first component of the device; forming a helical turn from the second oblique portion of the connector; locating the helical turn in a hinge element of the device; and attaching the second end of the connector to the second component.

Thus the invention provides a simple connector which may be assembled without additional parts and thus provides an easy assembly implementation. In addition such an electrical connector is able to withstand many open and shut operations of a device since it is only subjected to longitudinal forces along the length of the connector.

BRIEF DESCRIPTION OF THE DRAWINGS

The invention will now be described, by way of example only, with reference to the accompanying drawings, in which:

FIG. 1 shows a plan view of a first embodiment of a connector according to the invention;

FIG. 2 shows a plan view of a second embodiment of a connector according to the invention in a flat state;

DETAILED DESCRIPTION OF THE INVENTION

Figure 3:
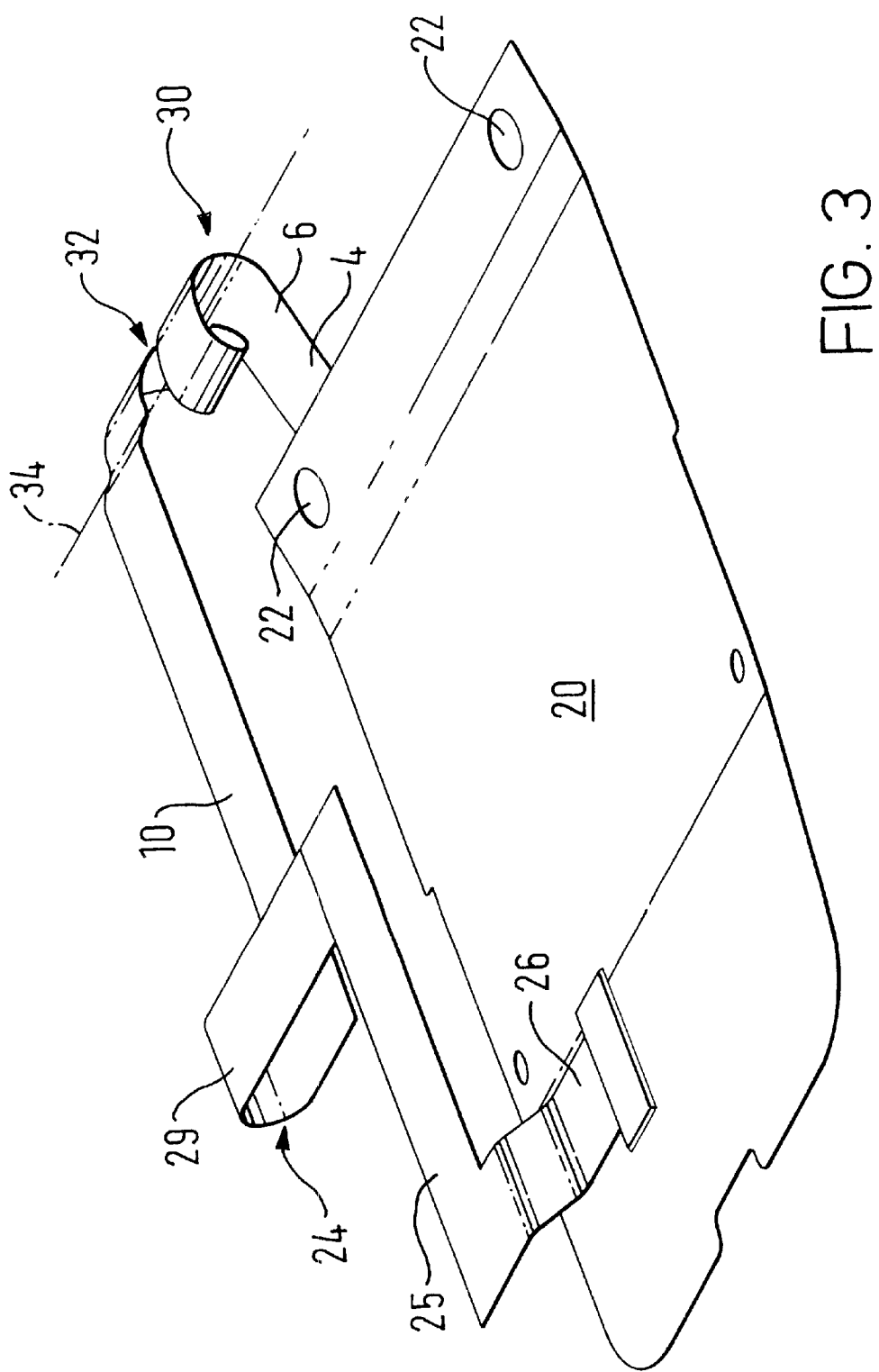
FIG. 3 shows the connector of FIG. 2 in the position adopted when mounted in a device.

The electrical connector as shown in the figures is designed to fit an electronic device having two parts hinged together. One example of such a device is a mobile telephone of the so-called clam- or flip-type. A first part generally houses the display and loudspeaker components and the second part generally houses the keypad, the microphone and other components.

The connector is generally extended in form. The connector 2 of FIG. 1 comprises a first end 4 for connection to the display and speaker components in a first part of a mobile phone. From the first end 4 of the connector, a first portion 6 leads to a portion 8 at an oblique angle to the first portion. The angled portion 8 is dimensioned so as to fit within the hinge of the device in a manner to be described below. A third portion 10, parallel to the first portion 6, generally extends away from the first portion 6 to provide an elongate body. The end 12 of the third portion of the connector is adapted for connection to components, such as the keypad and microphone (not shown), housed in the second part of the mobile phone.

The second portion 8 is designed to form a helical turn in the connector when mounted in the two parts of a device.

FIG. 2 shows a second embodiment of the connector. Parts that are common to FIG. 1 are labelled with the same numerals. In the embodiment shown in FIG. 2, the end 4 is connected to a sheet 20 which has holes 22. These holes 22 engage with corresponding projections on the first part of the device housing (not shown) to allow for correct positioning of the connector 2 with respect to the housing of the first part and the electrical components therein.

The third portion 10 leads to a fourth portion 24 which is at right angles to the third portion. The fourth portion 24 leads to a fifth portion 26 which is at right angles to the fourth portion. The fifth portion 26 leads to a sixth portion 28 which is at right angles to the fifth portion. The third, fourth, fifth and sixth portions 10, 24, 26, 28 together form a step arrangement in the connector 2. The distal end of the connector 12 is now the end of the sixth portion 28.

In the embodiment shown in FIGS. 2 and 3, the third portion 10 of the connector is designed to extend for around 30% of the length of the housing of the telephone and then to execute a 90° turn 29 along fourth portion 24. This allows the third portion 10 of the connector to fit behind a printed circuit board (PCB) between the PCB and the housing. The connector does not therefore make contact with components mounted on the PCB. The connector is then connected to the surface of the PCB distant from the housing by plugging the end 12 into a connector on the board.

Figure 4:
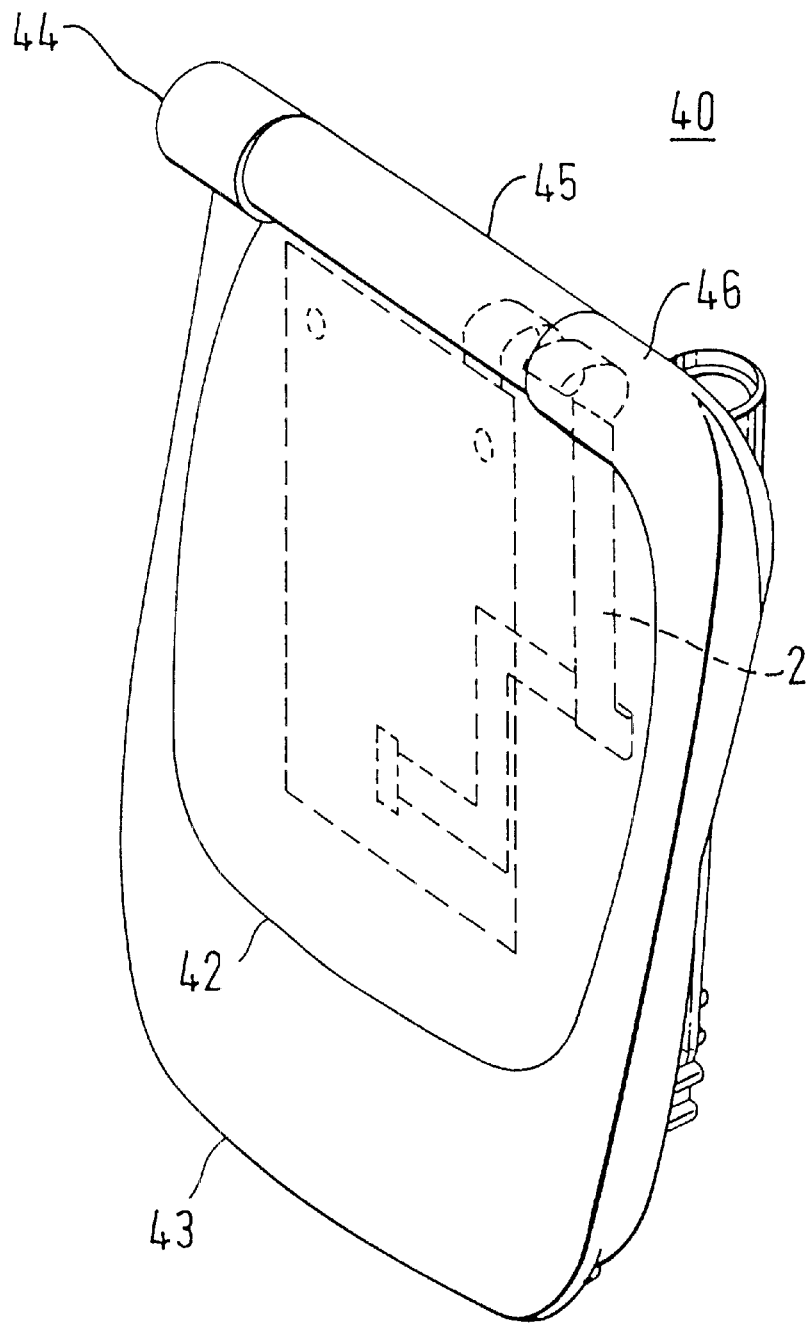
FIG. 4 shows the connector of FIGS. 2 and 3 in situ in a device.

FIG. 3 shows the connector of FIG. 2 in the position adopted when mounted in a device having two parts coupled together in a hinged manner, the device being in a closed position. For clarity FIG. 3 does not show the parts of the electronic device. FIG. 4 shows a side view of such a device in a closed position with the connector 2 in dotted outline.

When positioned within the hinge elements of the first and second parts of the device, the connector 2, from the first end 4, executes a 180° loop 30 formed by the first section 6 followed by a 360° helical turn 32 formed by the second section 8. This helical turn means that the connector travels along the longitudinal axis 34 of the hinge. In the embodiment shown, which is suitable for a mobile phone, the longitudinal extent of the helical turn 32 is of the order of 9 mm.

As shown in FIG. 4, a device 40 comprises a first part 42 and a second part 43 which are coupled together by a hinge 44. The hinge comprises a knuckle 45 on the first part 42 and a knuckle 46 on the second part 43. The connector 2 is shown in position in dotted line. As can be seen, the helical turn 32 is located within the knuckles 45, 46 and allows the connector to connect components in the first part 42 and the second part 43 without getting jammed in the hinge 44 and without additional elements.

The first portion 6 and the second portion 8 of the connector 2 are so proportioned that the loop 30 and the helical turn 32 are sufficiently slack to allow for the opening of the two part device.

Figure 5:
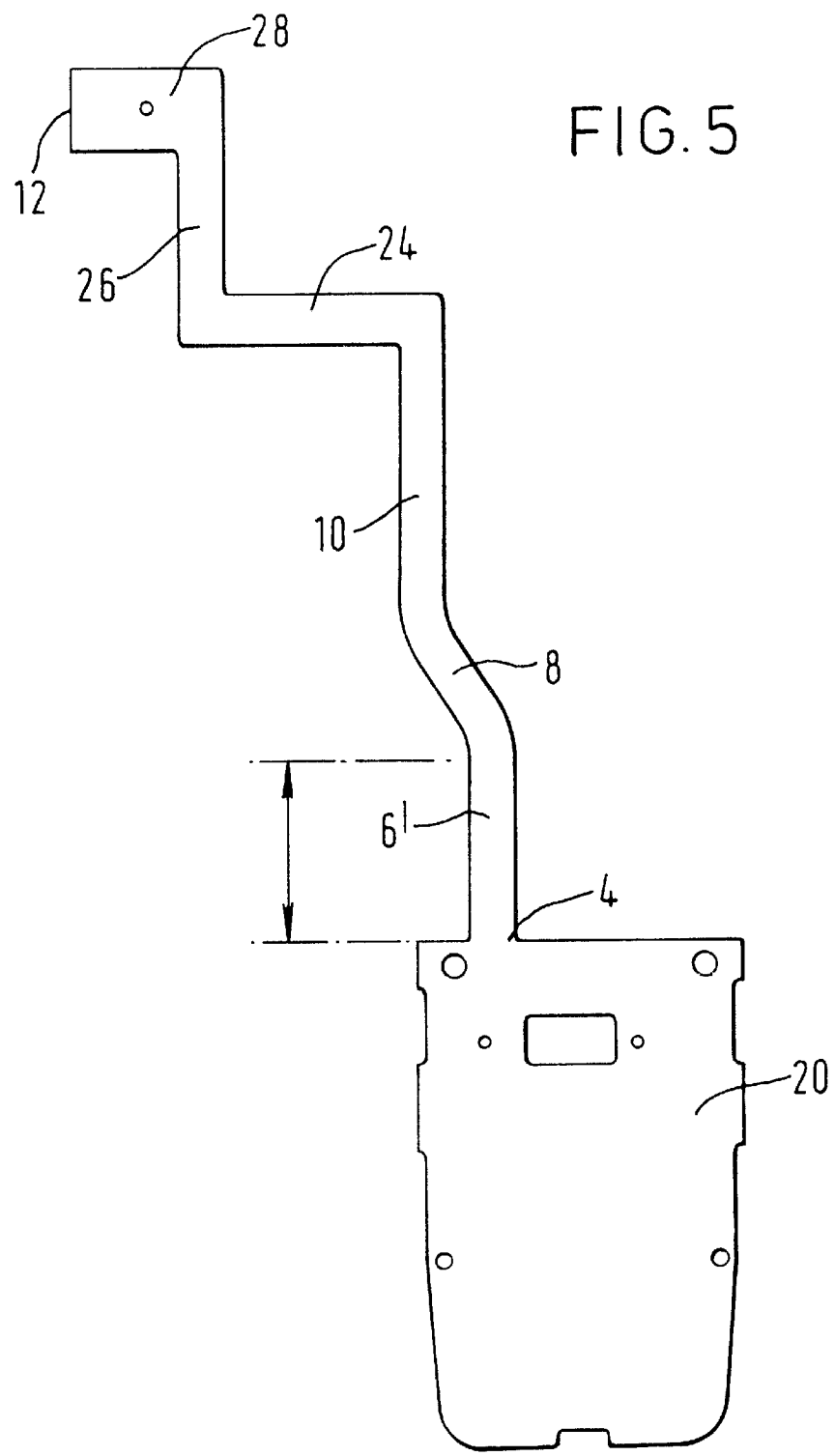
FIG. 5 shows a plan view of a third embodiment of a connector according to the invention in a flat state.

FIG. 5 shows a third embodiment of a connector according to the invention. Again, the same reference numerals are used for parts already described with reference to previous drawings. The connector shown has a first portion 6' which is dimensioned so at to accommodate the formation of a 360° loop from the first portion 6'. The length of the first portion 6' is around 24 mm for a connector for a typical mobile phone.

Figure 6:
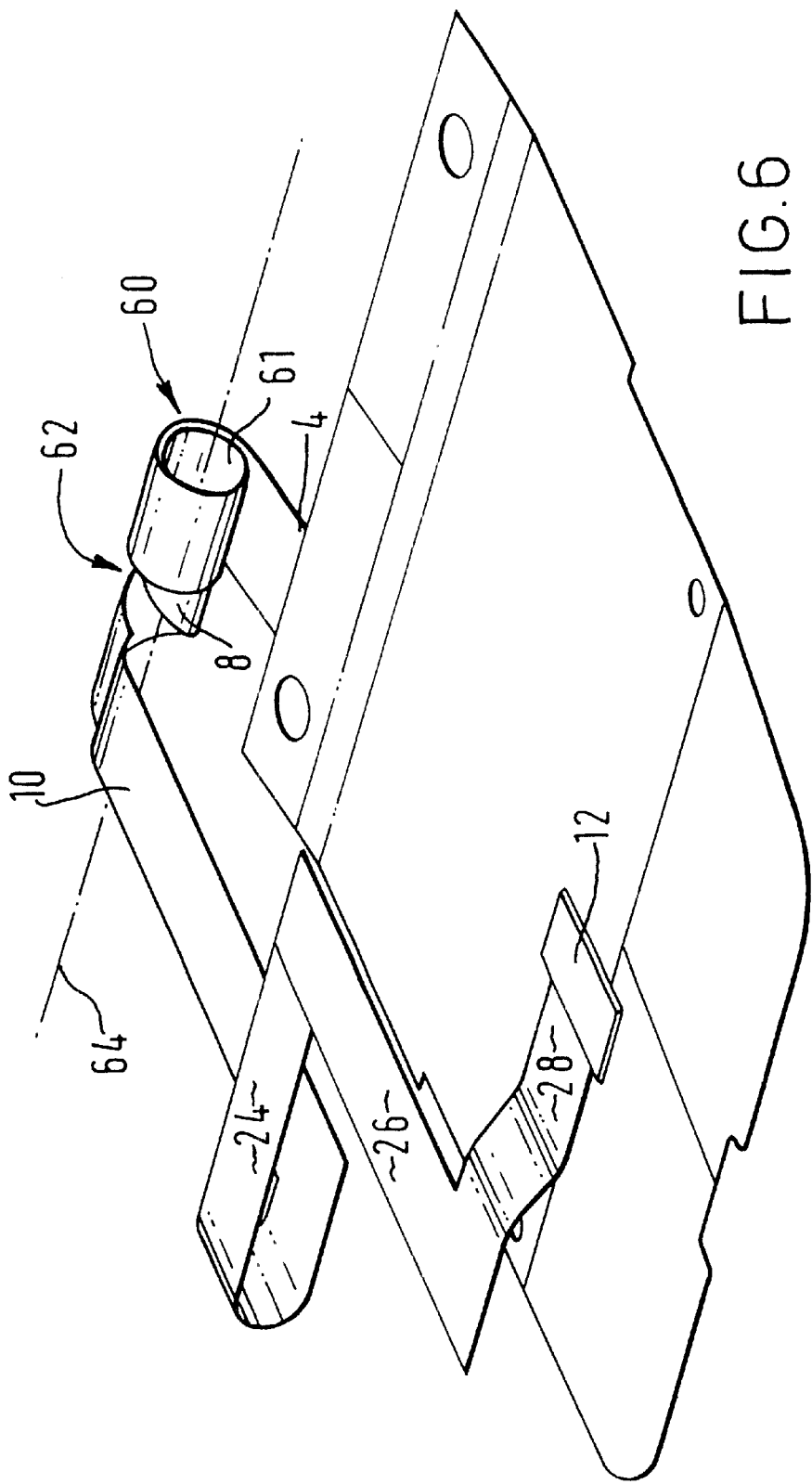
FIG. 6 shows the connector of FIG. 5 in the position adopted when mounted in a device.

As shown in FIG. 6 when the connector shown in FIG. 5 is assembled, the connector 2, from the first end 4, executes a 360° loop 60 formed by the first portion 6' followed by a 360° helical turn 62 formed by the second portion 8. This helical turn means that the connector travels along the longitudinal axis 64 of the hinge. In the embodiment shown, which is suitable for a mobile phone, the longitudinal extent of the helical turn 62 is of the order of 9 mm.

What is claimed is:

1. An electronic device comprising:
    at least a first part and a second part, the first part and second part being movable between a first closed position and a second open position;
    a hinge for coupling together the first part and the second part, the hinge providing a axis of rotation and including a knuckle on the first part and a knuckle on the second part; and
    an electrical connector for connecting electronic components housed in the first part and the second part, said connector being routed via the hinge,
    wherein the electrical connector comprises:
        an elongated body having a loop followed by a helical turn, said loop and said helical turn extend along a longitudinal axis of said hinge from within the knuckle on the first part to within the knuckle on the second part,
        wherein said longitudinal axis along which said loop and said helical turn extend is different from an axis parallel to portions of said elongated body excluding said loop and said helical turn, and
        wherein said helical turn extends co-axially along said longitudinal axis and said loop does not extend co-axially along said longitudinal axis.

2. An electronic device according to claim 1, wherein said helical turn is a 360° turn.

3. An electronic device according to claim 1, wherein the loop is a 180° loop formed adjacent to said helical turn.

4. An electronic device according to claim 2, wherein said loop is a 360°.

5. An electrical connector comprising:
    an elongated body having a loop followed by a helical turn along its length wherein a longitudinal axis along which said loop and said helical turn extend being different from an axis parallel to portions of said elongated body excluding said loop and said helical turn, and
    wherein said helical turn extends coaxially along said longitudinal axis and said loop does not extend coaxially along said longitudinal axis.

6. An electrical connector according to claim 5, wherein said loop is a 360° loop formed adjacent to said helical turn.

7. An electrical connector for connecting together at least two electronic components, said electrical connector comprising:
    a first end;
    a second end;
    a first section one end of which is said first end connectable to a first component;
    a second section for forming a loop in the connector;
    a third section at an oblique angle to said second section, said third section for forming a helical turn in the connector; and
    a fourth section parallel to said first section, one end of said fourth section being said second end connectable to a second component,
    wherein said loop of said second section and said helical turn of said third section extend along an axis different from an axis parallel to said first and fourth sections, and
    wherein said helical turn extends co-axially along said longitudinal axis and said loop does not extend co-axially along said longitudinal axis.

8. An electrical connector according to claim 7, further comprising:
    a fifth section connected to said fourth section, at right-angles to the fourth section;
    a sixth section at right-angles to said sixth section;
    a seventh section at right-angles to said sixth section, said seventh section having an end connectable to said second component; and
    said fourth, fifth, sixth and seventh sections being arranged in a step formation leading generally in the same direction as said third section.

9. A method of assembling an electronic device having at least two parts coupled together in a hinged manner, said method comprising:

taking an electrical connector for connecting together said at least two electronic components, the connector comprises:
- a first end,
- a second end,
- a first section one end of which is said first end connectable to a first component,
- a second section for forming a loop in the connector,
- a third section at an oblique angle to second section, said third section for forming a helical turn in the connector, and
- a fourth section parallel to said first section, one end of said fourth section being said second end connectable to a second component;

connecting the first end of the connector to said first component of the device;

forming said loop in said second section of the connector and forming said helical turn in said third section of the connector;

locating said loop and said helical turn along a longitudinal axis of a hinge element of the device; and attaching the second end of the connector to said second component, wherein said longitudinal axis along which said loop of said second section and said helical turn of said third section extend is different from an axis parallel to said first and fourth section, and wherein said helical turn extends co-axially along said longitudinal axis and said loop does not extend co-axially along said longitudinal axis.

10. A method according to claim 9, wherein said loop is formed as a 360° loop in said first section.

11. A flexible electrical connector for connecting together at least two electronic components, said flexible electrical connector includes an elongate body with a generally planar surface, said flexible electrical connector when flat comprising;

a first section for forming a loop in the connector, one end of said first section being connectable to a first component;

a second section at an oblique angle to the first section for forming a helical turn in the connector; and a third section, parallel to the first section, for connection to a second component, wherein, when assembled, the loop and the helical turn extend along a single longitudinal axis and the planar surface of the first and second section of the flexible electrical connector forming the loop and helical turn forms a generally cylindrical surface co-axial with the longitudinal axis, and wherein said helical turn extends co-axially along the longitudinal axis and said loop does not extend co-axially along the longitudinal axis.

* * * * *